United States Patent
Maret et al.

(10) Patent No.: US 10,233,762 B2
(45) Date of Patent: Mar. 19, 2019

(54) COOLED SEAL ASSEMBLY FOR ARRANGING BETWEEN A STATOR AND A ROTOR

(71) Applicant: United Technologies Corporation, Hartford, CT (US)

(72) Inventors: Alexander J. Maret, Middletown, CT (US); Jonathan L. Miller, Ware, MA (US)

(73) Assignee: United Technologies Corporation, Farmington, CT (US)

( * ) Notice: Subject to any disclaimer, the term of this patent is extended or adjusted under 35 U.S.C. 154(b) by 712 days.

(21) Appl. No.: 14/770,658

(22) PCT Filed: Feb. 24, 2014

(86) PCT No.: PCT/US2014/017985
§ 371 (c)(1),
(2) Date: Aug. 26, 2015

(87) PCT Pub. No.: WO2014/133952
PCT Pub. Date: Sep. 4, 2014

(65) Prior Publication Data
US 2016/0010477 A1    Jan. 14, 2016

Related U.S. Application Data

(60) Provisional application No. 61/770,147, filed on Feb. 27, 2013.

(51) Int. Cl.
*F16J 15/34*      (2006.01)
*F01D 11/00*      (2006.01)
(Continued)

(52) U.S. Cl.
CPC ............ *F01D 11/003* (2013.01); *F01D 25/12* (2013.01); *F02C 7/28* (2013.01); *F16J 15/3404* (2013.01);
(Continued)

(58) Field of Classification Search
CPC ........ F01D 11/003; F01D 25/12; F01D 11/00; F01D 25/00; F02C 7/28; F02C 7/00;
(Continued)

(56) References Cited

U.S. PATENT DOCUMENTS 2,990,202 A * 6/1961 Dennison ............... F01D 11/003
277/385
3,057,542 A * 10/1962 Keenan ................... F01D 11/04
384/317

(Continued)

*Primary Examiner* — Nathan Cumar
(74) *Attorney, Agent, or Firm* — O'Shea Getz P.C.

(57) ABSTRACT

A seal assembly is provided that extends along an axial centerline, and includes a rotor seal element that engages with a stator seal element. The rotor seal element extends radially between an inner element side and an outer element side, and includes a channel, a plurality of first passages and a plurality of second passages. The channel extends radially into the rotor seal element from the inner element side. The first and the second passages are fluidly coupled with the channel. Each of the first passages extends radially through the rotor seal element to a respective first passage outlet. Each of the second passages extends axially through the rotor seal element to a respective second passage outlet.

13 Claims, 6 Drawing Sheets

(51) Int. Cl.
*F01D 25/12* (2006.01)
*F02C 7/28* (2006.01)

(52) U.S. Cl.
CPC ...... *F05D 2220/32* (2013.01); *F05D 2240/55* (2013.01); *F05D 2260/20* (2013.01); *F05D 2260/201* (2013.01)

(58) Field of Classification Search
CPC .... F16J 15/3404; F16J 15/34; F05D 2220/32; F05D 2240/55; F05D 2260/20; F05D 2260/201; F05D 2220/00; F05D 2240/00; F05D 2250/00; F05D 2260/00
USPC .......................................................... 277/399
See application file for complete search history.

(56) References Cited

U.S. PATENT DOCUMENTS

| | | | |
|---|---|---|---|
| 4,928,978 A * | 5/1990 | Shaffer | F01D 25/183 277/401 |
| 5,284,347 A * | 2/1994 | Pope | F01D 11/025 277/305 |
| 5,311,734 A | 5/1994 | Pope et al. | |
| 5,464,227 A | 11/1995 | Olson | |
| 5,639,096 A | 6/1997 | Ullah | |
| 6,322,081 B1 | 11/2001 | Ullah et al. | |
| 7,984,911 B2 | 7/2011 | Dobek et al. | |
| 8,308,426 B2 | 11/2012 | Cigal et al. | |
| 2012/0027570 A1 | 2/2012 | Cigal et al. | |

\* cited by examiner

COOLED SEAL ASSEMBLY FOR ARRANGING BETWEEN A STATOR AND A ROTOR

This application claims priority to PCT Patent Application No. PCT/US14/17985 filed Feb. 24, 2014, which claims priority to U.S. Patent Appln. No. 61/770,147 filed Feb. 27, 2013.

BACKGROUND OF THE INVENTION

1. Technical Field

This disclosure relates generally to rotational equipment and, more particularly, to a cooled seal assembly for arranging between a stator and a rotor of, for example, a turbine engine.

2. Background Information

A seal assembly is typically used in rotational equipment to provide a seal between regions of high and low fluid pressure and/or temperature. A seal assembly may be used, for example, to provide a gas and/or liquid seal between a stator and a rotor of a turbine engine, a pump, a compressor, a turbine of, for example, a hydro-electric generator, as well as various other rotational equipment.

A seal assembly for a turbine engine may include a carbon seal that is connected to a seal housing. The seal housing interacts with a seal support with a plurality of fasteners. The seal support is connected to a turbine engine stator with a plurality of fasteners. Coil springs are arranged axially between the seal housing and the seal support to bias the carbon seal axially against a seal landing, which may be mounted on a turbine engine shaft adjacent an inner race of a bearing.

Frictional engagement between the carbon seal and the seal landing as well as frictional engagement between roller elements and the inner and outer races of the bearing may generate heat energy as a byproduct of turbine engine operation. This heat energy may be partially removed utilizing engine lubrication oil as a heat exchange fluid. The oil may be directed from a first set of apertures in the shaft into passages extending through the seal landing. Oil may also be independently directed from a second set of apertures in the shaft into passages extending through the inner race of the bearing.

There is a need in the art for an improved seal assembly.

SUMMARY OF THE DISCLOSURE

According to an aspect of the invention, a seal assembly is provided that extends along an axial centerline. The seal assembly includes an annular rotor seal element that is engaged with an annular stator seal element. The rotor seal element extends radially between an inner element side and an outer element side. The rotor seal element includes an annular channel, a plurality of first passages and a plurality of second passages. The channel extends radially into the rotor seal element from the inner element side. The first and the second passages are fluidly coupled with the channel. Each of the first passages extends radially through the rotor seal element to a respective first passage outlet. Each of the second passages extends axially through the rotor seal element to a respective second passage outlet.

According to another aspect of the invention, an assembly is provided for a turbine engine. The assembly includes a shaft, a rotor, a stator seal element and a rotor seal element. The shaft extends along an axial centerline and includes a plurality of shaft apertures. The rotor is mounted on the shaft and includes a plurality of rotor passages. The rotor seal element is mounted on the shaft. The rotor seal element is arranged between and engaged with the rotor and the stator seal element. The rotor seal element includes a channel, a plurality of first passages and a plurality of second passages. The channel extends radially into the rotor seal element. The first passages extend radially through the rotor seal element. The second passages extend axially through the rotor seal element. The channel fluidly couples the shaft apertures to the first and the second passages. The second passages fluidly couple the channel to the rotor passages.

According to still another aspect of the invention, a seal assembly is provided that extends along an axial centerline. The seal assembly includes a stator seal element and a rotor seal element that is engaged with the stator seal element. The rotor seal element includes a plurality of first passages and a plurality of second passages. One of the first passages extends radially through the rotor seal element between a first passage inlet and a first passage outlet. One of the second passages extends axially through the rotor seal element between a second passage inlet and a second passage outlet. Each of the second passages is arranged laterally between a respective adjacent pair of the first passages.

The rotor seal element may extend radially between an inner element side and an outer element side. The rotor seal element may include an annular channel that extends radially into the rotor seal element from the inner element side. The first passages and/or the second passages may be fluidly coupled with the channel.

The assembly may include a rotor (e.g., an annular spacer) that defines a channel (e.g., an annular channel) with the rotor seal element. The first passages and/or the second passages may be fluidly coupled with the channel.

The rotor seal element may include a sleeve and a seal seat flange that extends radially out from the sleeve to the outer element side. One or more of the first passages may extend radially through the seal seat flange to the respective first passage outlet. In addition, one or more of the second passages may extend axially through the sleeve to the respective second passage outlet.

The sleeve may extend axially between a first element end and a second element end. The seal seat flange may be axially displaced from the first element end by a first axial length, and/or axially displaced from the second element end by a second axial length.

A first passage outlet may be located at the outer element side.

A first passage may include a slot and a hole. The slot may extend radially into the rotor seal element and axially between the channel and the hole. The hole may extend radially between the slot and the respective first passage outlet.

A first passage may extend axially, radially and/or laterally (e.g., circumferentially or tangentially) through the rotor seal element to the respective first passage outlet.

A second passage may include a slot that extends radially into the rotor seal element and axially between the channel and the respective second passage outlet.

The channel may be an annular first channel. The rotor seal element may include an annular second channel that extends radially into the rotor seal element from the inner element side. The second passages may extend axially between the first channel and the second channel.

The rotor seal element may axially engage the stator seal element.

The stator seal element may be configured as a face seal. The rotor seal element may be configured as a face seal landing.

The rotor may be configured as an inner race of a bearing.

The foregoing features and the operation of the invention will become more apparent in light of the following description and the accompanying drawings.

DETAILED DESCRIPTION OF THE INVENTION

Figure 1:
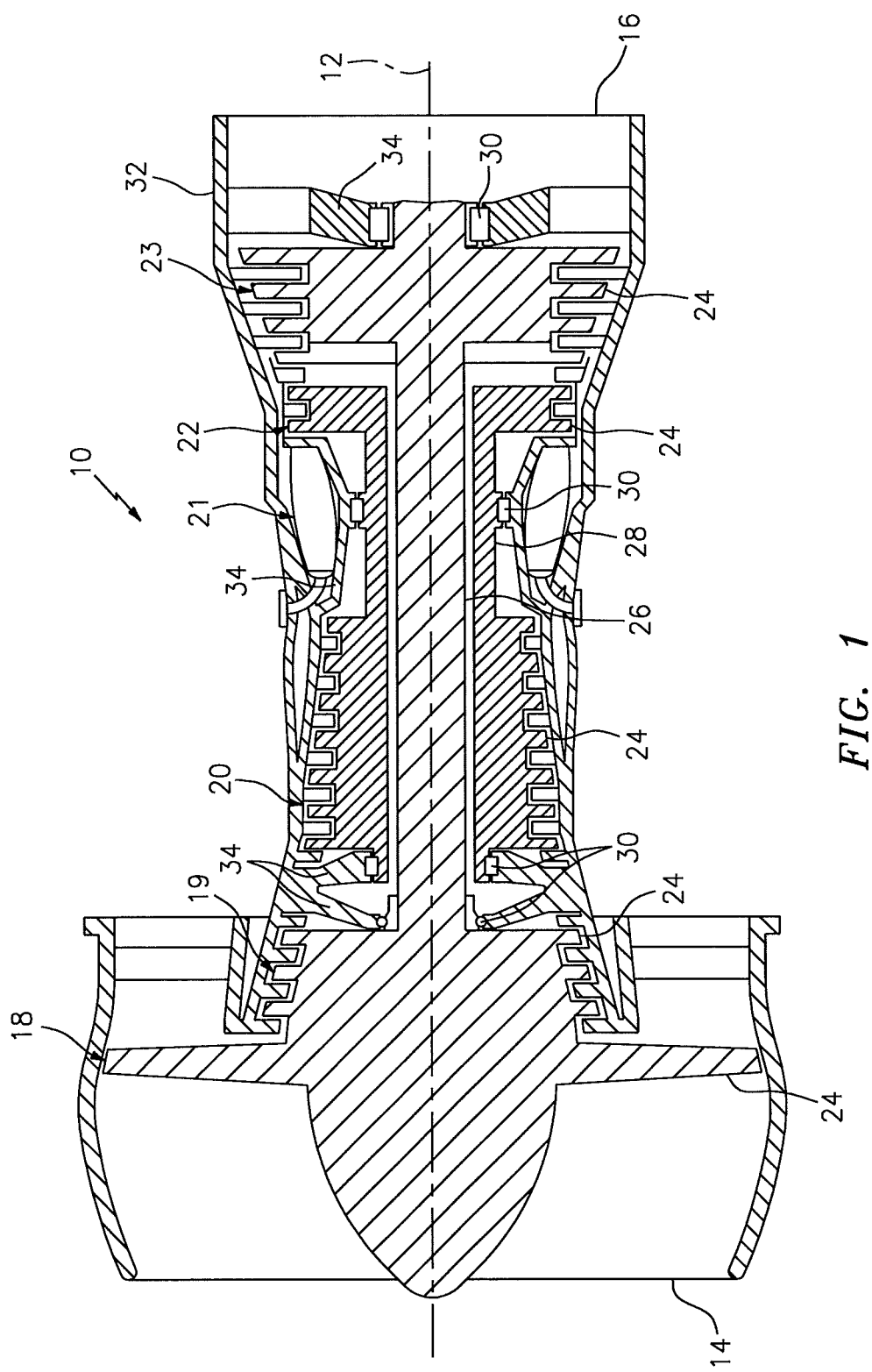
FIG. 1 is a sectional illustration of a turbine engine.

FIG. 1 illustrates a turbine engine 10 that extends along an axial centerline 12 between a forward airflow inlet 14 and an aft airflow exhaust 16. The engine 10 includes a plurality of engine sections such as, for example, a fan section 18, low and high pressure compressor sections 19 and 20, a combustor section 21, and high and low pressure turbine sections 22 and 23. Each of the engine sections 18-20, 22 and 23 includes a rotor assembly with one or more rotor stages 24.

Each of the rotor stages 24 includes a plurality of rotor blades arranged circumferentially around and connected to a rotor disk. The rotor stages 24 of the engine sections 18, 19 and 23 may be connected to a first (e.g., low speed) shaft 26. The rotor stages 24 of the engine sections 20 and 22 may be connected to a second (e.g., high speed) shaft 28. The first and the second shafts 26 and 28 are rotatably supported by a plurality of bearings 30. Each of the bearings 30 is connected to an engine case 32 by at least one stator 34 such as, for example, an annular support strut.

Figure 2:
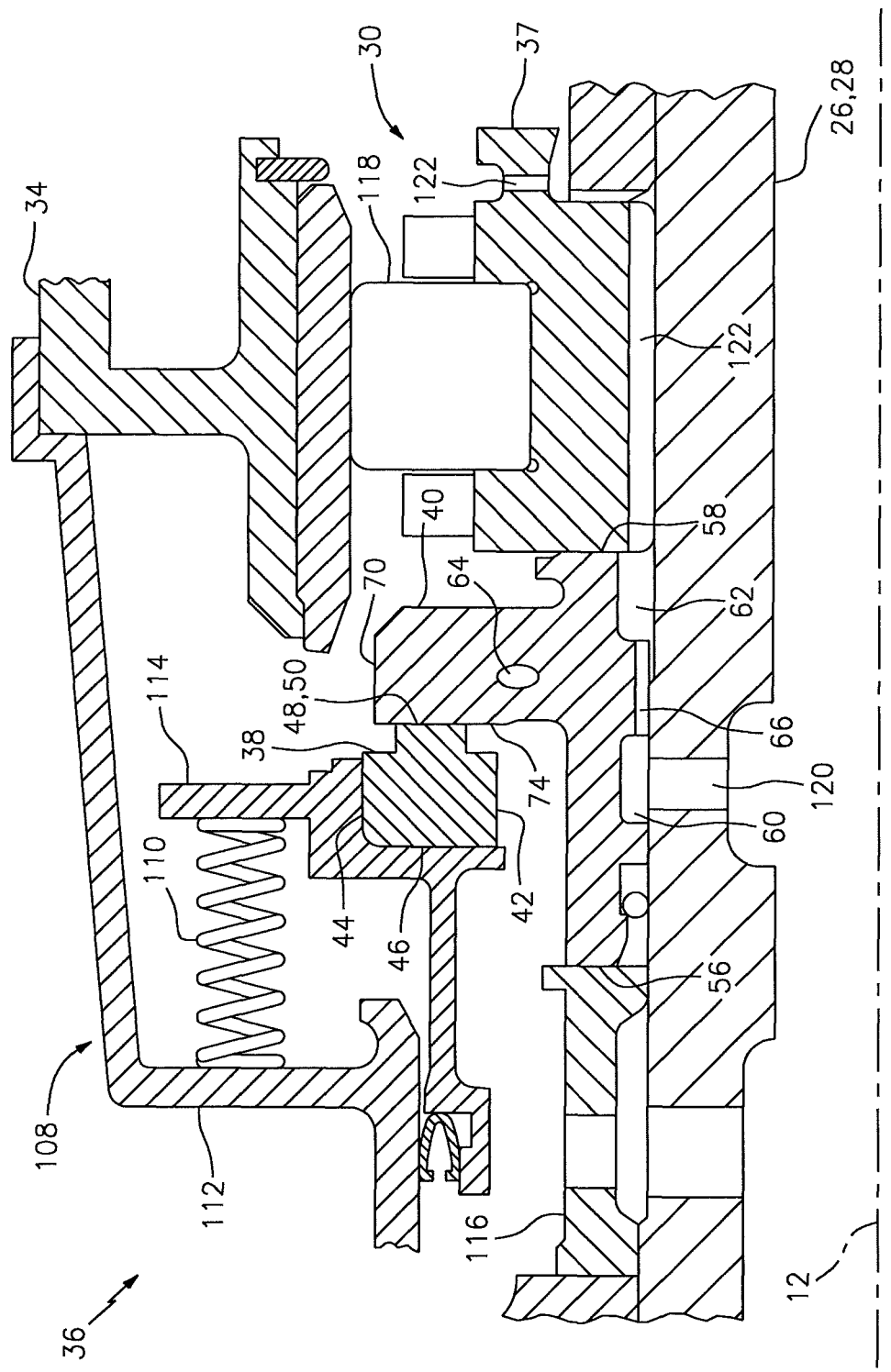
FIG. 2 is a partial, sectional illustration of a seal assembly for the engine of FIG. 1.

FIG. 2 illustrates a seal assembly 36 for sealing a gap between one of the stators 34 and a first rotor 37 such as, for example, an inner race of a respective one of the bearings 30. The seal assembly 36 includes an annular stator seal element 38 (e.g., a carbon face seal) and a rotor seal element 40 (e.g., a face seal landing).

The stator seal element 38 extends circumferentially around the centerline 12. The stator seal element 38 extends radially between an inner element side 42 and an outer element side 44. The stator seal element 38 extends axially between a first (e.g., forward) element end 46 and a face seal surface 48 located at (e.g., on, adjacent or proximate) a second (e.g., aft) element end 50.

Figure 3:
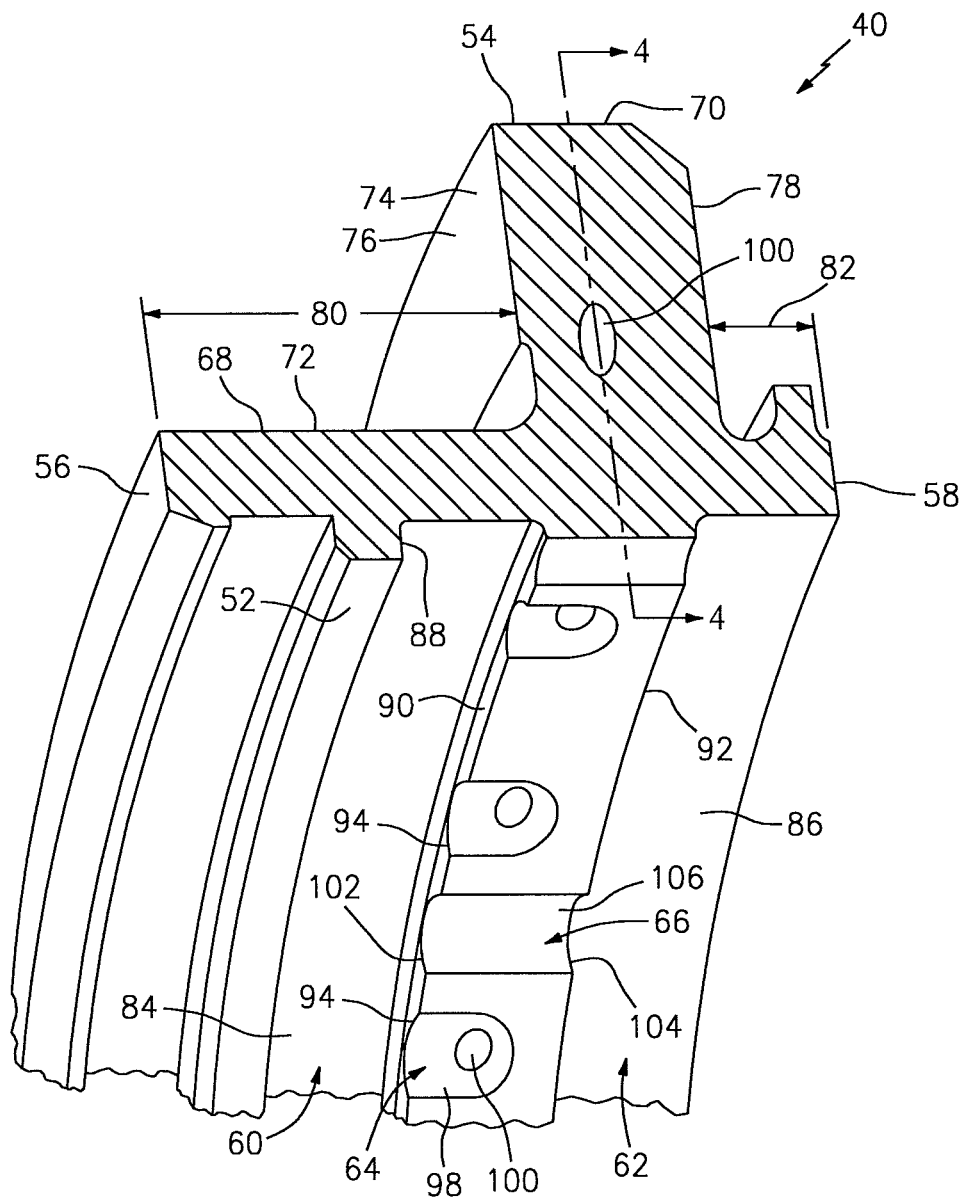
FIG. 3 is a partial, perspective illustration of a rotor seal element for the seal assembly of FIG. 2.

Referring to FIG. 3, the rotor seal element 40 extends circumferentially around the centerline. The rotor seal element 40 extends radially between an inner element side 52 and an outer element side 54. The rotor seal element 40 extends axially between a first (e.g., forward) element end 56 and a second (e.g., aft) element end 58. The rotor seal element 40 includes one or more annular channels 60 and 62, a plurality of first passages 64 and a plurality of second passages 66. The rotor seal element 40 embodiment of FIG. 3 also includes an annular sleeve 68, an annular seal seat flange 70.

The sleeve 68 extends radially between the inner element side 52 and an outer sleeve side 72. The sleeve 68 extends axially between the first element end 56 and the second element end 58. The flange 70 extends radially out from the outer sleeve side 72 to the outer element side 54. The flange 70 extends axially between a seal land surface 74 located at a first (e.g., forward) flange end 76 and a second (e.g., aft) flange end 78. The first flange end 76 may be axially displaced from the first element end 56 by a first axial length 80. The second flange end 78 may be axially displaced from the second element end 58 by a second axial length 82 that may be different (e.g., less than) the first axial length 80.

Each of the channels 60 and 62 extends radially into the sleeve 68 from the inner element side 52 to a respective distal channel side 84, 86. The first channel 60 extends axially between a first (e.g., forward) channel end 88 and a second (e.g., aft) channel end 90. The first channel 60 may radially taper from the second channel end 90 to the first channel end 88. The second channel 62 extends axially between a first (e.g., forward) channel end 92 and the second element end 58. The second channel 62 may radially taper from the second element end 58 to the first channel end 92.

Figure 4:
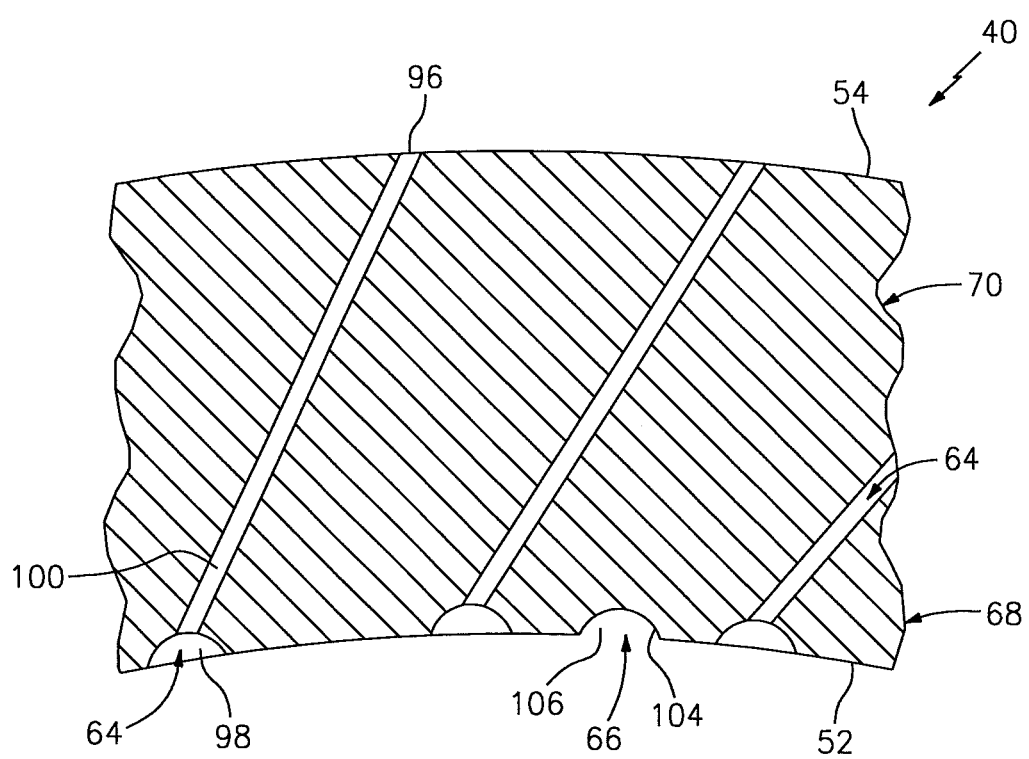
FIG. 4 is a partial, cross-sectional illustration of the rotor seal element of FIG. 3.

Referring to FIGS. 3 and 4, the first passages 64 are arranged circumferentially around the centerline and fluidly coupled with the first channel 60. Each of the first passages 64 extends radially through the rotor seal element 40 between a respective first passage inlet 94 and a respective first passage outlet 96. In the embodiment of FIGS. 3 and 4, for example, one or more of the first passages 64 includes a slot 98 and a hole 100. The slot 98 extends radially into the sleeve 68 from the inner element side 52. The slot 98 extends axially into the sleeve 68 from the respective first passage inlet 94, which may be located at the second channel end 90, to the hole 100. The slot 98 may radially taper from the hole 100 to the first passage inlet 94. The hole 100 extends radially through the sleeve 68 and/or the flange 70 between the slot 98 and the respective first passage outlet 96, which may be located at the outer element side 54. The hole 100 may also extend laterally (e.g., circumferentially or tangentially) and/or axially through the sleeve 68 and/or the flange 70 between the slot 98 and the respective first passage outlet 96.

Referring to FIG. 3, the second passages 66 are arranged circumferentially around the centerline and fluidly coupled with the first and the second channels 60 and 62. Each of the second passages 66 may be arranged laterally between a respective adjacent pair of the first passages 64. Each of the second passages 66 extends axially through the rotor seal element 40 between a respective second passage inlet 102 and a respective second passage outlet 104. In the embodiment of FIG. 3, for example, one or more of the second passages 66 is configured as a slot 106 that extends radially into the sleeve 68 from the inner element side 52. The slot 106 extends axially through the sleeve 68 between second passage inlet 102 and the second passage outlet 104. The slot 106 may radially taper from the second passage outlet 104 to the second passage inlet 102. The second passage inlet 102 may be located at the second channel end 90. The second passage outlet 104 may be located at the first channel end 92.

Referring to FIG. 2, the stator seal element 38 is connected to the respective stator 34 with a seal mount 108. The seal mount 108 embodiment of FIG. 2, for example, includes a plurality of springs 110 arranged axially between a seal support 112 and a seal housing 114. The seal support 112 is connected to the stator 34, and the stator seal element 38 is seated within the seal housing 114. The seal mount 108 may also include one or more anti-rotation elements (not shown), which may prevent the stator seal element 38 from rotating about the centerline 12 and relative to the stator 34. The present invention, of course, is not limited to any particular seal mount configurations.

The rotor seal element 40, the first rotor 37 and a second rotor 116 such as, for example, a spacer are mounted on the respective shaft 26, 28. Alternatively, the rotor seal element 40, the first rotor 37 and/or the second rotor 116 may be mounted on another component, which is mounted on the respective shaft 26, 28. The rotor seal element 40 is arranged axially between the first rotor 37 and the stator seal element 38 as well as the second rotor 116. The second element end 58 axially engages (e.g., contacts) the first rotor 37. The seal land surface 74 axially engages the face seal surface 48, which forms a rotary fluid (e.g., gas and/or liquid) seal therebetween. The first element end 56 axially engages the second rotor 116.

Frictional engagement between the stator seal element 38 and the rotor seal element 40 as well as frictional engagement between the first rotor 37 and roller elements 118 of the respective bearing 30 may generate heat energy as a byproduct of turbine engine 10 operation. This heat energy may be at least partially removed from the rotor seal element 40 and the first rotor 37 utilizing a heat exchange fluid such as, for example, engine lubrication oil. The heat exchange fluid, for example, may be directed into the first channel 60 from a plurality of shaft apertures 120 that extend radially through a sidewall of the respective shaft 26, 28. A first portion of the heat exchange fluid is directed through the first passages 64 to remove heat energy from the flange 70. A second portion of the heat exchange fluid is directed through the second passages 66 and the second channel 62 to the first rotor 37. The second portion of the heat exchange fluid may subsequently be directed through a plurality of rotor passages 122, which extend (e.g., axially and/or radially) through the first rotor 37, to remove heat energy from the first rotor 37 and/or lubricate the respective bearing 30.

In some embodiments, the rotor seal element 40 may include a first number (x) of the first passages 64 and a second number (y) of the second passages 66. The first number (x) may be greater than the second number (y) in order to, for example, direct a larger quantity of the heat exchange fluid through the flange 70 than to the bearing 30. Alternatively, the first number (x) may be substantially equal to the second number (y), and each of the first passages 64 may have a larger flow area than each of the second passages 66. In other embodiments, the first and the second passages 64 and 66 may be configured to direct a larger quantity of the heat exchange fluid to the bearing 30 than through the flange 70. In still other embodiments, the first and the second passages 64 and 66 may be configured to direct substantially equal quantities of the heat exchange fluid through the flange 70 and to the bearing 30, or alternatively any other turbine engine component.

Figure 5:
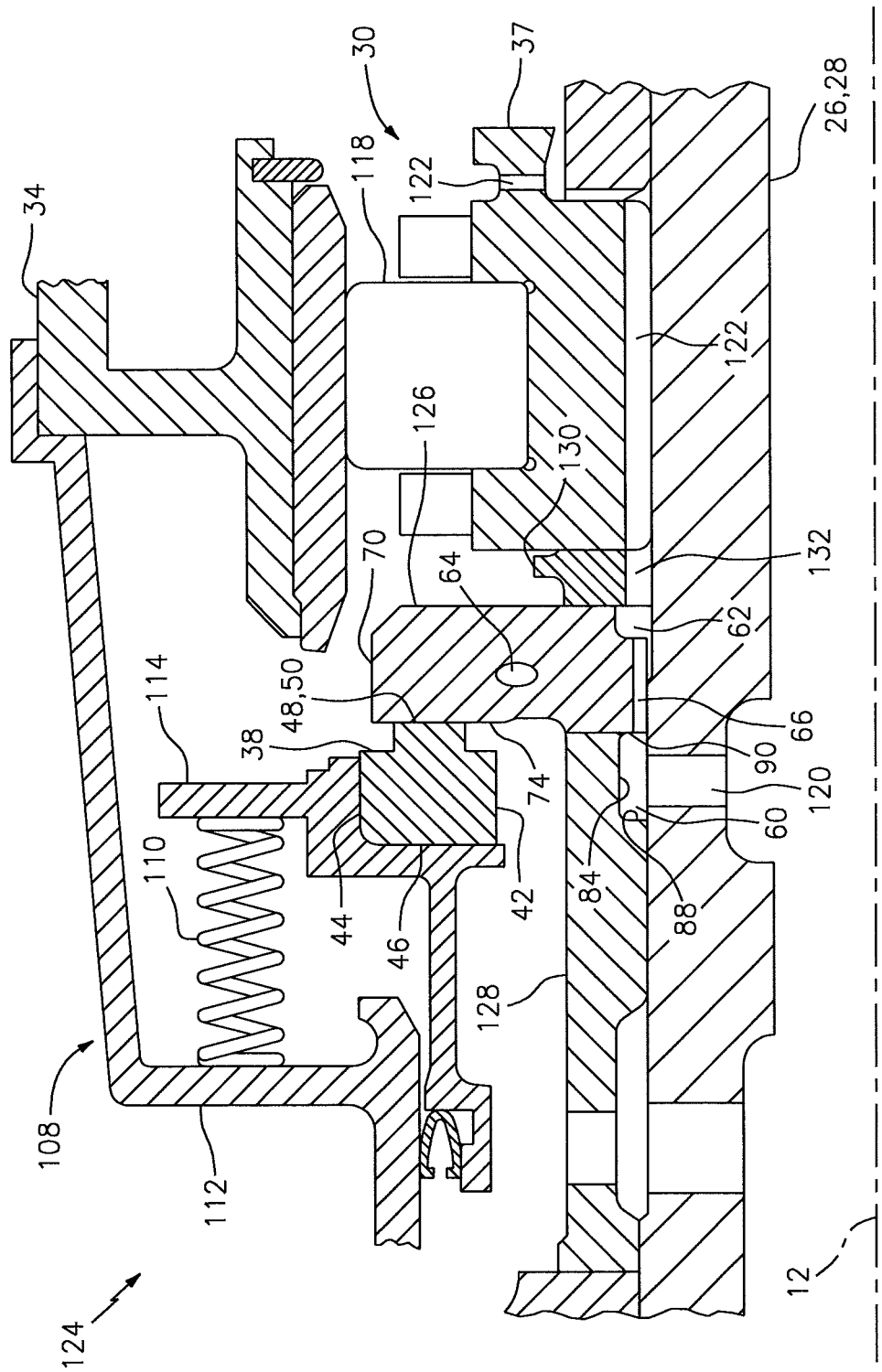
FIG. 5 is a partial, sectional illustration of another seal assembly for the engine of FIG. 1.

FIG. 5 illustrates another seal assembly 124 for sealing a gap between one of the stators 34 and the first rotor 37. The seal assembly 124 includes an alternate embodiment rotor seal element 126 that is arranged axially between a second rotor 128 (e.g., a spacer) and a third rotor 130 (e.g., a spacer). The rotor seal element 126 partially defines the first channel 60 with the second rotor 128. The rotor seal element 126, for example, defines the channel end 90. The second rotor 128 defines the channel side 84 and the channel end 88. The third rotor 130 includes one or more passages 132, which fluidly couple the second channel 62 to the rotor passages 122.

Figure 6:
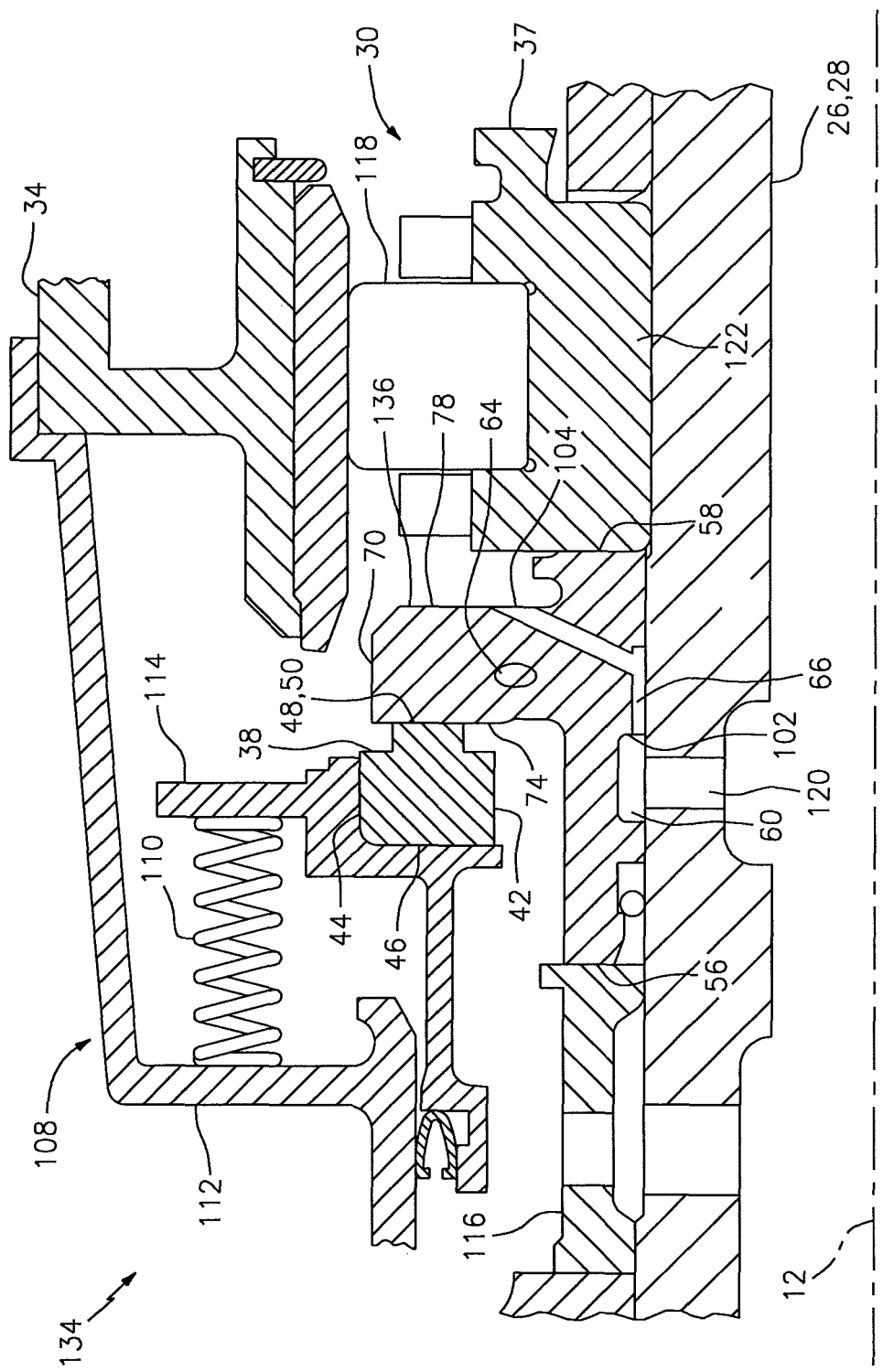
FIG. 6 is a partial, sectional illustration of still another seal assembly for the engine of FIG. 1.

FIG. 6 illustrates another seal assembly 134 for sealing a gap between one of the stators 34 and the first rotor 37. The seal assembly 134 includes an alternate embodiment rotor seal element 136. In this embodiment, the second passages 66 extend axially and radially through the rotor seal element 136 between the second passage inlets and outlets 102 and 104. The second passage outlets 104, for example, may be located at the second flange end 78. In this manner, the second passages may direct the heat exchange fluid towards the roller elements 118, or alternatively any other turbine engine component.

A person of skill in the art will recognize the first passages may be utilized to cool rotor seal element embodiments other than the rotor seal element embodiments described above and illustrated in the drawings. For example, one or more additional passages may extend radially, axially and/or laterally through the rotor seal element 40, 126 or 136 to direct the heat exchange fluid towards one or more turbine engine components. The present invention therefore is not limited to any particular stator and/or rotor seal element types or configurations.

The terms "forward", "aft", "inner" and "outer" are used to orientate the components of the turbine engine assemblies 36, 124 and 134 described above relative to the turbine engine 10 and its axis 12. A person of skill in the art will recognize, however, one or more of these components may be utilized in other orientations than those described above. One or more of the mounting brackets, for example, may be located at the inner side of the vane arrangement. The present invention therefore is not limited to any particular spatial orientations.

The turbine engine assemblies 36, 124 and 134 may be included in various turbine engines other than the one described above. The turbine engine assembly, for example, may be included in a geared turbine engine where a gear train connects one or more shafts to one or more rotors in a fan section, a compressor section and/or any other engine section. Alternatively, the turbine engine assembly may be included in a turbine engine configured without a gear train. The turbine engine assembly may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines, or locations within a turbine engine.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A seal assembly extending along an axial centerline, comprising:
   an annular stator seal element; and
   an annular rotor seal element engaged with the annular stator seal element, the annular rotor seal element extending radially between an inner element side and an outer element side, and including an annular channel extending radially into the annular rotor seal element from the inner element side;
a plurality of first passages fluidly coupled with the channel, each of the first passages extending radially through the annular rotor seal element to a respective first passage outlet; and
a plurality of second passages fluidly coupled with the channel, each of the second passages extending axially through the annular rotor seal element to a respective second passage outlet.

2. The seal assembly of claim 1, wherein
the annular rotor seal element includes a sleeve and a seal seat flange that extends radially from the sleeve to the outer element side;
each of the first passages extends radially through the seal seat flange to the respective first passage outlet; and
each of the second passages extends axially through the sleeve to the respective second passage outlet.

3. The seal assembly of claim 2, wherein
the sleeve extends axially between a first element end and a second element end; and
the seal seat flange is axially displaced from the first element end by a first axial length, and axially displaced from the second element end by a second axial length.

4. The seal assembly of claim 1, wherein a first of the first passage outlets is located at the outer element side.

5. The seal assembly of claim 1, wherein
a first of the first passages include a slot and a hole;
the slot extends radially into the annular rotor seal element and axially between the channel and the hole; and
the hole extends radially between the slot and the respective first passage outlet.

6. The seal assembly of claim 1, wherein a first of the first passages further extends laterally through the annular rotor seal element to the respective first passage outlet.

7. The seat assembly of claim 1, wherein a first of the second passages includes a slot that extends radially into the annular rotor seal element and axially between the channel and the respective second passage outlet.

8. The seal assembly of claim 1, wherein
the channel comprises an annular first channel;
the annular rotor seal element further includes an annular second channel that extends radially into the annular rotor seal element from the inner element side; and
the second passages extend axially between the first channel and the second channel.

9. The seal assembly of claim 1, wherein the annular rotor seal element axially engages the annular stator seal element.

10. The seal assembly of claim 1, wherein the annular stator seal element comprises a face seal, and the annular rotor seal element comprises a face seal landing.

11. A seal assembly extending along an axial centerline, comprising:
a stator seal element; and
a rotor seal element engaged with the stator seal element, the rotor seal element including a plurality of first passages and a plurality of second passages;
wherein one of the first passages extends radially through the rotor seal element between a first passage inlet and a first passage outlet; and
wherein one of the second passages extends axially through the rotor seal element between a second passage inlet and a second passage outlet, and each of the second passages is arranged laterally between a respective adjacent pair of the first passages.

12. The seal assembly of claim 11, wherein
the rotor seal element extends radially between an inner element side and an outer element side, and further includes an annular channel that extends radially into the rotor seal element from the inner element side; and
the first passages and the second passages are fluidly coupled with the channel.

13. The seal assembly of claim 11, further comprising a rotor that defines a channel with the rotor seal element, wherein the first passages and the second passages are fluidly coupled with the channel.

* * * * *